Patented June 6, 1944

2,350,828

UNITED STATES PATENT OFFICE 2,350,828

CONVERSION OF HYDROCARBONS

Louis Schmerling, Chicago, Ill., and Arthur M. Durinski, Brooks Field, Tex., assignors to Universal Oil Products Company, Chicago, Ill., a corporation of Delaware No Drawing. Application June 17, 1942,
Serial No. 447,450

7 Claims. (Cl. 196—53)

This invention relates to a process employing special catalysts which can be utilized for the conversion of heavy hydrocarbons into lighter hydrocarbons such as, for example, the conversion of heavy distillate or residual fractions of petroleum into lower boiling fractions of gasoline boiling range.

It is more specifically concerned with hydrocarbon conversion processes which are conducted in the presence of hydrogen so as to lessen undesirable decomposition reactions and produce increased yields of the desired low boiling fractions.

The art of destructive hydrogenation of hydrocarbons to produce lower boiling fractions has been practiced not only on solid hydrocarbonaceous materials such as coals and shales but has also been practiced on the heavier liquid hydrocarbon fractions resulting from the primary distillation of crude petroleum and the primary distillation of solid carbonaceous substances. These conversions have been effected both with and without catalysts but as a general rule better results are obtained in respect to the yield of light products when catalysts have been employed to increase the rate of the conversion reactions and permit the use of more moderate temperatures and pressures. The present process is concerned with the use of special catalysts in destructive hydrogenation processes.

In one specific embodiment the present invention comprises a process for the destructive hydrogenation of heavy hydrocarbonaceous materials to produce fractions of lower boiling range therefrom which comprises heating the hydrocarbonaceous materials under hydrogen pressure in the presence of alumina and hydrogen halides.

The catalyst combinations which characterize the present invention are an improvement over those previously used in destructive hydrogenation processes in that the components are not affected, as are many other types of catalysts employed in similar reactions, by sulfur which may be present in the charging stocks. Alternatively, with alumina, other oxides of a refractory character may be used such as zirconium oxide, thorium oxide and others. The hydrogen halides which may be used alternatively include hydrogen chloride, hydrogen bromide and hydrogen iodide. Obviously, when using different combinations of oxides and halides, exactly similar catalytic effects are not to be anticipated.

Alumina is readily available from natural minerals such as bauxite, hydrargillite, or gibbsite which are preferably heated to dehydrate them to a point at least corresponding to the monohydrate before they are used. The temperature necessary for heating hydrated aluminas to produce this degree of hydration is generally between about 400 and about 600° C., and the invention comprises not only the use of precalcined natural minerals but also aluminas prepared by similar dehydration of hydrated aluminas precipitated from solutions of aluminum salts by the addition of alkaline precipitants such as, for example, ammonium hydroxide or ammonium carbonate. Satisfactory effects may be obtained with aluminas prepared from different sources but the efficiency will vary with the source of the material, its degree of dehydration and its physical condition.

In the operation of the process the conversions may be brought about by the so-called batch procedure in which hydrocarbonaceous material is mixed in a pressure vessel with finely divided coal or heavy oils such as, coal tar or petroleum distillates or residues, the requisite amount of hydrogen chloride and hydrogen is added and the vessel heated under pressure until the desired conversions are effected.

Continuous operations may be conducted by passing heavy hydrocarbon mixtures through beds of prepared alumina along with hydrogen and hydrogen chloride with proper proportioning of the reactants and the use of suitable rates of flow which correspond to the desired conversion. The alumina in such cases may be in the form of irregularly shaped granules or in the form of particles of regular shape and size such as those produced by extrusion or pelleting methods.

The temperatures employed in effecting conversions in accordance with the present process may include those from about 200 to about 600° C., though usually they will be between about 350 and about 400° C. Pressures of from 1 to about 100 atmospheres and any suitable excess of hydrogen may be employed which may be necessary to give the most efficient conversion with the lowest yields of undesirable decomposition products. Hydrogen chloride may be employed in amounts of from about 0.5 to about 50 per cent by weight of the alumina.

The following data are introduced to indicate the type of results obtainable in destructive hydrogenation reactions when using catalysts of the present type although it is not intended that the scope of the invention be correspondingly limited One hundred parts by weight of a Pennsylvania gas oil containing no hydrocarbons boiling in the gasoline range were placed in a pressure vessel and 10 parts by weight of aluminum oxide was added. Three parts by weight of hydrogen chloride was then added under pressure and hydrogen was introduced to an initial pressure of 100 atmospheres. The contents of the pressure vessel were then heated to 400° C. and maintained at this temperature for a period of 4 hours, after which the vessel was cooled and the gaseous reaction products released. By this procedure there were produced 89 parts by volume of normally liquid hydrocarbons and 3 parts by volume of normally gaseous hydrocarbons condensible at −78° C. at ordinary atmospheric pressure. The recovered liquid had an A. P. I. gravity of 48 and contained 37.5 parts by volume of products boiling up to 149° C. and 57 parts by volume of products boiling up to 204° C.

We claim as our invention:

1. A process for the treatment of heavy hydrocarbonaceous materials to produce lower boiling hydrocarbons therefrom which comprises destructively hydrogenating said material in the presence of added hydrogen chloride and alumina.

2. A process for the treatment of heavy hydrocarbonaceous materials to produce lower boiling hydrocarbons therefrom which comprises destructively hydrogenating said material in the presence of added hydrogen chloride and bauxite.

3. A process for the treatment of heavy hydrocarbonaceous materials to produce lower boiling hydrocarbons therefrom which comprises destructively hydrogenating said material in the presence of added hydrogen chloride and a partially dehydrated alumina prepared by heating a hydrated aluminum oxide at a temperature of from about 400 to about 600° C.

4. A process for the treatment of heavy petroleum fractions to produce gasoline therefrom which comprises destructively hydrogenating said fractions in the presence of added hydrogen chloride and alumina.

5. A process for the treatment of heavy petroleum fractions to produce gasoline therefrom which comprises destructively hydrogenating said fractions in the presence of added hydrogen chloride and bauxite.

6. A process for the treatment of heavy petroleum fractions to produce gasoline therefrom which comprises destructively hydrogenating said fractions in the presence of added hydrogen chloride and a partially dehydrated alumina prepared by heating a hydrated aluminum oxide at a temperature of from about 400 to about 600° C.

7. A process for the treatment of heavy hydrocarbonaceous materials to produce lower boiling hydrocarbons therefrom which comprises destructively hydrogenating said material at a temperature of from about 200 to about 600° C. under an initial pressure not substantially in excess of 100 atmospheres in the presence of added hydrogen chloride and alumina, the amount of hydrogen chloride being from about 0.5 to about 50 per cent by weight of the alumina.

LOUIS SCHMERLING.
ARTHUR M. DURINSKI.